US006658150B2

United States Patent
Tsuji et al.

(10) Patent No.: US 6,658,150 B2
(45) Date of Patent: Dec. 2, 2003

(54) IMAGE RECOGNITION SYSTEM

(75) Inventors: Takayuki Tsuji, Wako (JP); Nobuharu Nagaoka, Wako (JP); Hiroshi Hattori, Wako (JP); Masahito Watanabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 553 days.

(21) Appl. No.: 09/728,511

(22) Filed: Dec. 1, 2000

(65) Prior Publication Data

US 2001/0002936 A1 Jun. 7, 2001

(30) Foreign Application Priority Data

Dec. 2, 1999 (JP) ............................................. 11-343850

(51) Int. Cl.[7] ................................................. G06K 9/68
(52) U.S. Cl. ....................... 382/218; 382/154; 382/165; 382/170; 382/219
(58) Field of Search ................................. 382/168, 170, 382/171, 162, 165, 154, 181, 203, 209, 218, 219; 348/47

(56) References Cited

U.S. PATENT DOCUMENTS 5,801,760 A * 9/1998 Uomori ........................ 348/47
5,867,591 A * 2/1999 Onda ........................... 382/154
6,236,748 B1 * 5/2001 Iijima et al. .................. 382/154

FOREIGN PATENT DOCUMENTS

JP 11-343850 12/1999

* cited by examiner

*Primary Examiner*—Phuoc Tran
(74) *Attorney, Agent, or Firm*—Carrier, Blackman & Associates, P.C.; Joseph F. Carrier; William D. Blackman

(57) ABSTRACT

An image recognition system recognizes correspondence between object images contained respectively in two images obtained by two infrared ray cameras. One of the two images is set to a reference image and another of the two images to a comparison image. A correlation parameter indicative of a correlation between a reference pattern contained in the reference image and containing an object image and each pattern contained in the comparison image and identical in shape to the reference pattern is calculated by using a luminance value indicative of a luminance of the reference pattern and a luminance value indicative of a luminance of the each pattern contained in the comparison image. Based on the calculated correlation parameter, a pattern having a highest correlation with the reference pattern is extracted from the comparison image as a corresponding pattern which corresponds to the reference pattern. Identity between the object image contained in the reference pattern and the object image contained in the corresponding pattern is determined based on a difference between a contrast value indicative of a contrast of the reference pattern and a contrast value indicative of a contrast of the corresponding pattern.

8 Claims, 7 Drawing Sheets

RIGHT IMAGE

LEFT IMAGE

RIGHT IMAGE

LEFT IMAGE

RIGHT IMAGE

LEFT IMAGE

IMAGE RECOGNITION SYSTEM

BACKGROUND OF THE INVENTION

1. Field of the Invention

This invention relates to an image recognition system for recognizing the correspondence between object images contained respectively in two images obtained by two imaging devices.

2. Description of the Relevant Art

Conventionally, a method of detecting a distance to an object is widely known, in which two imaging devices are positioned apart from each other, and a distance to the object is detected based on images of the object contained in two images produced respectively by the two imaging devices. In this method, proper recognition of the correspondence between the object images contained in the respective two images is a prerequisite to accurate detection of the distance to the object.

The SAD (Sum of Absolute Differences) method is a well known method in which one of two images is set to a reference image, and the other of them to a comparison image, and an object image in the comparison image which corresponds to an object image in the reference image is extracted. In this SAD method, the absolute value of a difference between the luminance value of each pixel in a reference pattern which is contained in the reference image and containing the object image, and the luminance value of a corresponding pixel in each pattern which is contained in the comparison image and identical in shape to the reference pattern is calculated on a pixel-by-pixel basis, and the sum of the absolute values is set to a correlation value ERR indicative of the correlation between each two patterns, and then, a pattern minimizing the correlation value ERR (i.e. a pattern having a highest correlation with the reference pattern) is extracted as a corresponding pattern which corresponds to the reference pattern.

However, when the SAD method is employed, if the two imaging devices are different in characteristics (e.g. if the lens of one of the imaging devices is dirty and the luminance values of the corresponding image are generally lowered), the difference between the luminance values of the two object images contained in the respective reference and corresponding patterns is increased even though the two object images are identical in shape to each other, which results in increasing the correlation value ERR and in worst cases, the two object images cannot be determined to be identical.

To solve this problem, a stereo imaging system was proposed in Japanese Laid-Open Patent Publication (Kokai) No. 10-255020, in which a sensitivity-adjusting device is interposed between the two imaging devices and an image recognition system that carries out detection of a distance to an object and other functions, whereby levels of signals output from the respective imaging devices are adjusted for compensation for the difference in characteristics between the two imaging devices.

The sensitivity-adjusting device of the stereo imaging system stores data conversion tables associated respectively with the two imaging devices in a memory, and levels of the signals output from the imaging devices are converted by using the data conversion tables to output the resulting data. Further, to cope with the aging of the sensitivity-adjusting device, values of the data conversion tables are updated by using image data of a specific object at a location within the scope of the common imaging area of two imaging devices.

However, in the above conventional stereo imaging system, it is required to provide the sensitivity-adjusting device between the imaging devices and the image recognition system as well as the memory for storing the data conversion tables. This complicates the construction of the whole system, resulting in a considerable increase in manufacturing costs.

The adverse effects of the difference in characteristics between the two imaging devices can be eliminated by using a normalized cross-correlation parameter as a correlation parameter in place of the correlation value calculated by the SAD method. In the method using the normalized cross-correlation parameter, however, a large amount of arithmetic operation is required, which puts an increased load on an operation system. Therefore, when the image recognition system is installed e.g. on an automotive vehicle for monitoring environmental conditions, it is required to use an expensive arithmetic unit having a high operation speed, which inevitably becomes a main factor of increased manufacturing costs of the automotive vehicle.

SUMMARY OF THE INVENTION

It is an object of the invention to provide an image recognition system which is capable of accurately determining identity between object images contained respectively in images obtained by two imaging devices, with hardware having a relatively simple construction and through a small amount of arithmetic operation, even when the two imaging devices are different in characteristics.

To attain the above object, the present invention provides an image recognition system for recognizing correspondence between object images contained respectively in two images obtained by two imaging means, the image recognition system comprising:

corresponding pattern-extracting means for setting one of the two images to a reference image and the other of the two images to a comparison image, calculating a correlation parameter indicative of a correlation between a reference pattern contained in the reference image and containing an object image, and each pattern contained in the comparison image and identical in shape to the reference pattern, by using a luminance value indicative of a luminance of the reference pattern and a luminance value indicative of a luminance of each of the patterns contained in the comparison image, and extracting, based on the calculated correlation parameter, a pattern having a highest correlation with the reference pattern from the comparison image, as a corresponding pattern which corresponds to the reference pattern; and identity-determining means for determining identity between the object image contained in the reference pattern and an object image contained in the corresponding pattern based on a difference between a contrast value indicative of a contrast of the reference pattern and a contrast value indicative of a contrast of the corresponding pattern.

According to this image recognition system, the correlation parameter indicative of the correlation between the reference pattern contained in the reference image and containing the object image and each pattern contained in the comparison image and identical in shape to the reference pattern is calculated based on the luminance values of the two patterns, and then a pattern having a highest correlation with the reference pattern is extracted from the comparison image based on the calculated correlation parameter, as a corresponding pattern which corresponds to the reference pattern. Then, identity between the object image contained in the reference pattern and an object image contained in the corresponding pattern is determined based on a difference between a contrast value indicative of a contrast of the reference pattern and a contrast value indicative of a contrast of the corresponding pattern. Therefore, it is possible to accurately determine identity between the object images contained in the images obtained by the two imaging devices, respectively, with hardware having a relatively simple construction and through a small amount of arithmetic operation, even when the two imaging devices are different in imaging characteristics.

Preferably, the identity-determining means includes contrast difference component-calculating means for calculating a correlation parameter component corresponding to the difference between the contrast value indicative of the contrast of the reference pattern and the contrast value indicative of the contrast of the corresponding pattern, as a contrast difference component, and determination means for determining identity between the object image contained in the reference pattern and the object image contained in the corresponding pattern, based on a parameter obtained by subtracting the contrast difference component from the correlation parameter concerning the corresponding pattern.

According to this preferred aspect of the invention, the correlation parameter component corresponding to the difference between the contrast value indicative of the contrast of the reference pattern and the contrast value indicative of the contrast of the corresponding pattern is calculated, as a contrast difference component, and identity between the object image contained in the reference pattern and the object image contained in the corresponding pattern is determined based on a parameter obtained by subtracting the contrast difference component from the correlation parameter concerning the corresponding pattern. Therefore, it is possible to more accurately determine the identity between the object images.

Preferably, the identity-determining means calculates the contrast value indicative of the contrast of the reference pattern based on a difference between a luminance value indicative of a luminance of the object image contained in the reference pattern and a luminance value indicative of a luminance of a background portion within the reference pattern, and calculates the contrast value indicative of the contrast of the corresponding pattern based on a difference between a luminance value indicative of a luminance of the object image contained in the corresponding pattern and a luminance value indicative of a luminance of a background portion within the corresponding pattern.

Preferably, the corresponding pattern-extracting means calculates overall contrast values indicative of overall contrasts of the two images, respectively, and sets one of the two images whose overall contrast value is the larger one of the calculated overall contrast values, to the reference image.

According to this preferred aspect of the invention, the overall contrast values of the two images are calculated, and then one of the two images whose contrast value is the larger of the two calculated overall contrast values is set to the reference image. Therefore, it is possible to avoid erroneous identity recognition of the object images due to a difference in contrast between the two images, and hence reliably determine identity of the object images.

Preferably, the corresponding pattern-extracting means calculates each of the overall contrast values indicative of the overall contrasts of the two images by the following steps:

(1) generating a histogram indicative of a frequency distribution of luminance values of each of the two images;

(2) calculating a background peak luminance value at which a portion of the histogram corresponding to a background of the each of the two images exhibits a maximum frequency;

(3) calculating an object peak luminance value at which a portion of the histogram corresponding to the object image contained in each of the two images exhibits a maximum frequency; and (4) calculating an overall contrast value for the each of the two images based on a difference between the object peak luminance value and the background peak luminance value.

Preferably, the identity-determining means determines that the object image contained in the reference pattern and the object image contained in the corresponding pattern are not identical when the difference between the contrast value indicative of the contrast of the reference pattern and the contrast value indicative of the contrast of the corresponding pattern is larger than a predetermined value.

Preferably, the corresponding pattern-extracting means includes means for setting the reference pattern such that the reference pattern contains a plurality of similar objects positioned close to each other, by clustering.

The above and other objects, features, and advantages of the invention will become more apparent from the following detailed description taken in conjunction with the accompanying drawings.

BRIEF DESCRIPTION OF THE DRAWINGS

FIGS. 4A and 4B are diagrams which are useful in explaining gray scale images obtained by infrared cameras, with halftone portions represented by hatched areas, in which:

FIG. 4A shows a right image obtained by a right one of the infrared cameras;

FIG. 4B shows a left image obtained by a left one of the same;

FIGS. 10A and 10B are diagrams useful in explaining problems encountered when there exist a plurality of objects similar to each other, in which:

FIG. 10A shows a right image obtained by the right one of the infrared cameras; and FIG. 10B shows a left image obtained by the left one of the same.

DETAILED DESCRIPTION

The invention will now be described in detail with reference to drawings showing an embodiment thereof.

Figure 1:
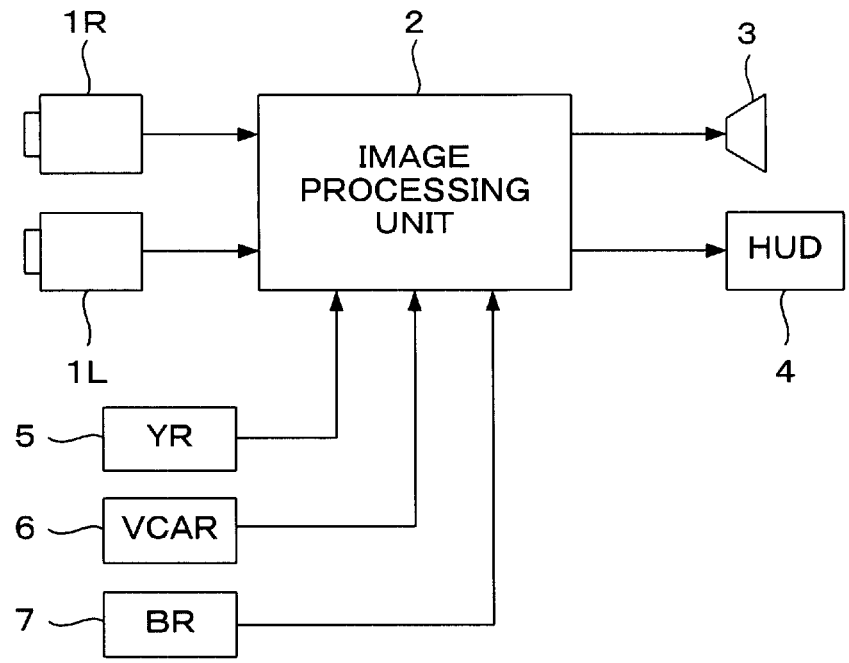
FIG. 1 is a block diagram showing the arrangement of a vehicle environment monitoring system including an image recognition system according to an embodiment of the invention.

Referring first to FIG. 1, there is shown the arrangement of a vehicle environment monitoring system including an image recognition system according to the embodiment. The vehicle environment monitoring system is provided with two (right and left) infrared cameras 1R, 1L capable of detecting far-infrared rays, a yaw rate sensor 5 for detecting the yaw rate of the vehicle, a vehicle speed sensor 6 for detecting the traveling speed (vehicle speed) VCAR of the vehicle, a brake sensor 7 for detecting the operation amount of a brake, not shown, an image-processing unit 2 for detecting an object, such as an animal or the like, ahead of the vehicle based on image data obtained by the above cameras 1R, 1L and warning the driver when there is a high possibility of collision against the object, a speaker 3 for generating a voice alarm for warning the driver, and a head up display (hereinafter referred to as the "HUD") 4 for displaying an image obtained by the camera 1R or 1L and thereby causing the driver to recognize the object having the high possibility of collision against the vehicle.

Figure 2:
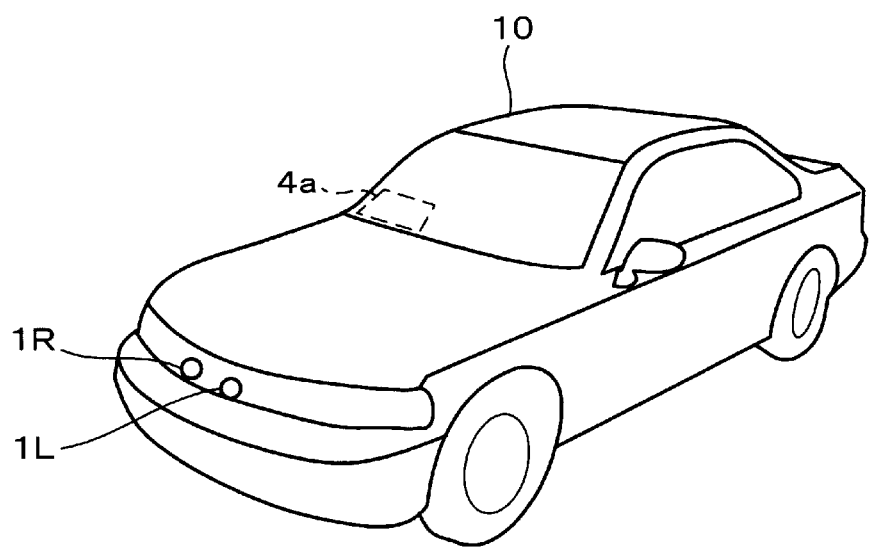
FIG. 2 is a diagram illustrating portions of a vehicle at which cameras appearing in FIG. 1 are mounted.

As shown in FIG. 2, the cameras 1R, 1L are arranged in a front portion of the automotive vehicle 10 at locations symmetric with respect to the longitudinal central axis of the vehicle 10, and rigidly fixed to the vehicle such that the two cameras 1R, 1L have optical axes in parallel with each other and equal heights from a road surface. The infrared cameras 1R, 1L have a characteristic that as the temperature of an object is higher, they output signals at respective higher levels (indicative of higher luminance of respective images of the object).

The image-processing unit 2 includes an A/D converter circuit for converting input analog signals to digital signals, an image memory for storing digitized image signals, a CPU (Central Processing Unit) for carrying out arithmetic operations, a RAM (Random Access Memory) used by the CPU for storing data being processed by the arithmetic operations, a ROM (Read Only Memory) storing programs executed by the CPU, tables, and maps, and an output circuit for outputting a drive signal to the speaker 3, a display signal to the HUD 4, and so forth. Output signals from the cameras 1R, 1L and the sensors 5 to 7 are converted to digital signals and input to the CPU.

As shown in FIG. 2, the HUD 4 is arranged such that a screen 4a thereof is displayed in a front window at a location ahead of the driver.

Figure 3:
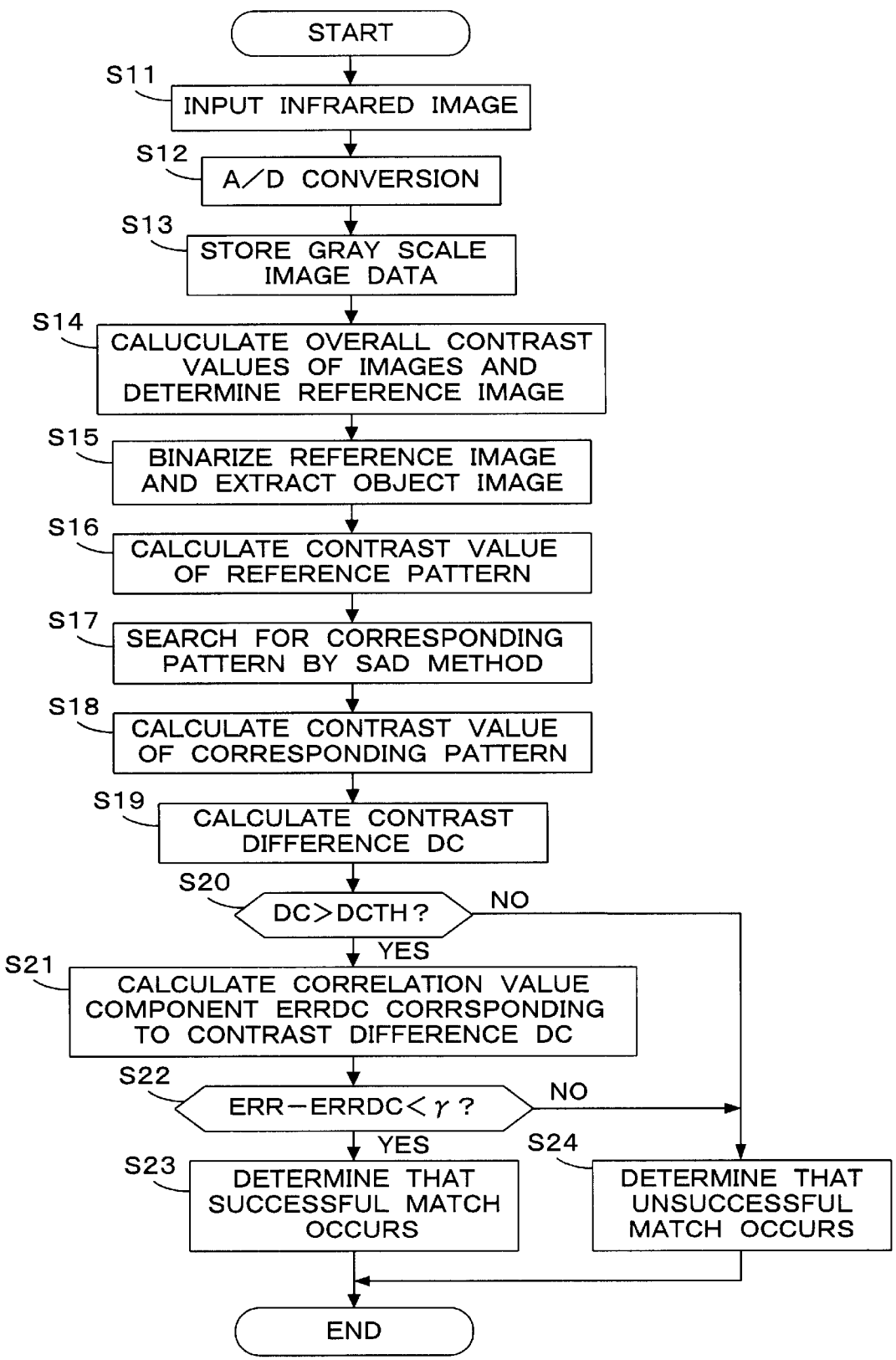
FIG. 3 is a flowchart showing a procedure of image-recognizing processing executed by an image-processing unit appearing in FIG. 1.
Figure 4A:
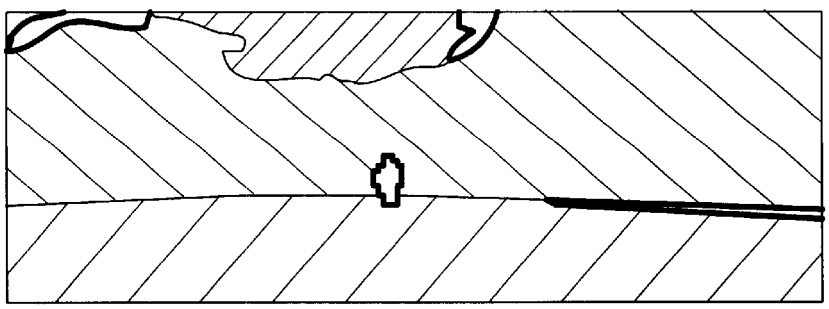
Figure 4B:
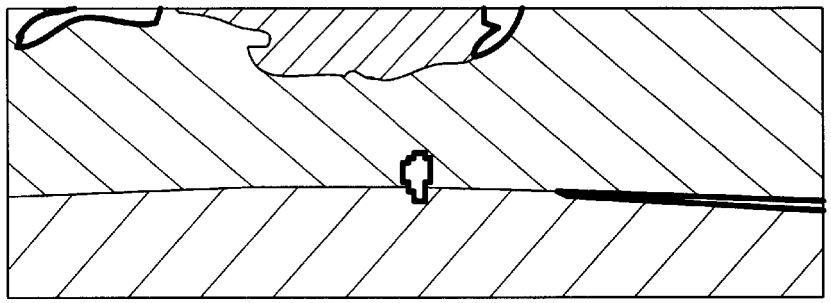

FIG. 3 is a flowchart showing a procedure of image-recognizing processing executed by the image-processing unit 2. First, output signals from the cameras 1R, 1L are subjected to A/D conversion by the A/D converter circuit and the resulting digital data are stored in the image memory (steps S11, S12, S13). Images stored in the image memory are gray scale images including luminance information. FIGS. 4A and 4B are diagrams for explaining gray scale images obtained by the respective cameras 1R, 1L (a right image by the camera 1R, and a left image by the camera 1L). Hatched areas in the right and left images are halftone (gray) areas, while areas surrounded by thick solid lines are areas at a high luminance level (at a high temperature) which are areas (hereinafter referred to as "high luminance areas") of detected objects displayed in white on the screen. In the right image and the left image, an identical object is displayed as images at respective locations horizontally displaced from each other, so that it is possible to calculate a distance from the vehicle 10 to the object, based on the displacement (parallax).

At step S14 in FIG. 3, an overall contrast value CT indicative of an overall contrast of each of the whole right and left images is calculated by using the following expression (1):

$$CT = \beta \times Log\ (IPEAK2 - IPEAK1) \qquad (1)$$

wherein $\beta$ represents a constant (>0); Log represents a logarithm using base 10; and IPEAK1 and IPEAK2 represent luminance values corresponding respectively to a background peak and an object peak shown in FIGS. 6A and 6B. The luminance value corresponding to the background peak (background peak luminance value) IPEAK1 and the luminance value corresponding to the object peak (object peak luminance value) IPEAK2 are calculated as follows.

Figure 6A:
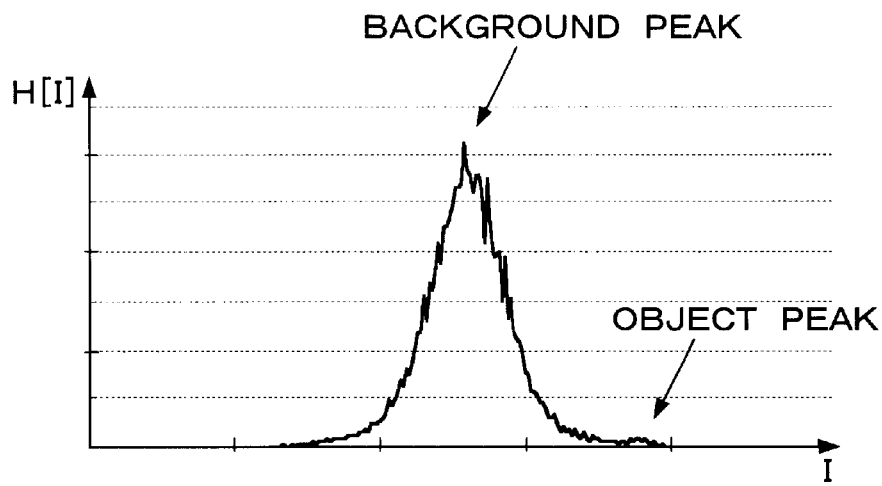
FIGS. 6A and 6B are diagrams useful in explaining a process for calculating a contrast value of a whole image.
Figure 6B:
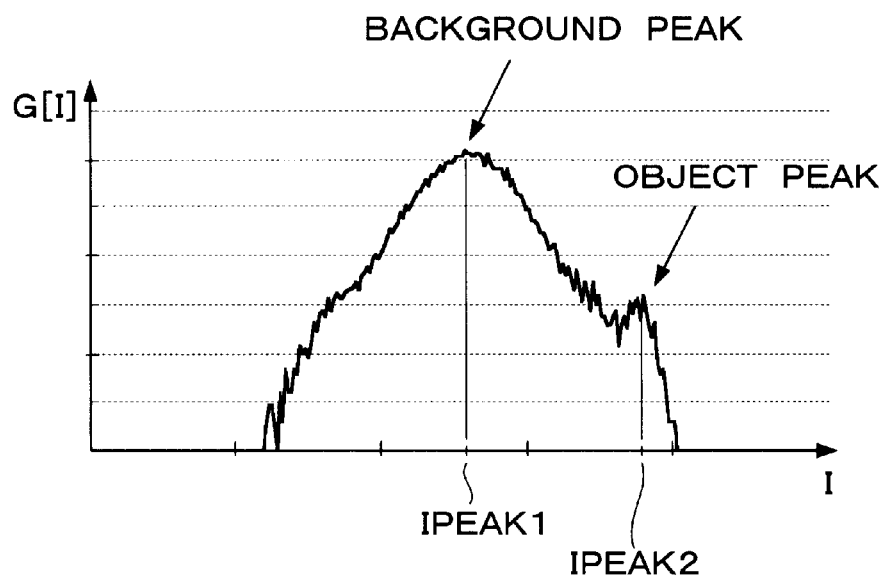

First, a histogram is calculated in which the abscissa represents a luminance value I and the ordinate represents the number of pixels having the luminance value I, i.e. frequency H[I] of pixels having the luminance value I, as shown in FIG. 6A. Normally, as shown in the figure, a background peak exists in the proximity of the average luminance value of the background. On the other hand, the frequency H of pixels at an object peak corresponding to an object at a high temperature is low, so that it is difficult to identify the object peak in FIG. 6A. Therefore, the histogram indicative of the frequency H[I] is logarithmically transformed to another histogram (G[I]=Log (H[I]+1)) as shown in FIG. 6B, whereby the background peak and the object peak are identified. It should be noted that the reason why "1" is added to the frequency H[I] in the logarithmic transformation is that it is required to prevent G[I] from becoming indefinite when H[I] is equal to "0".

The overall contrast values indicative of the overall contrasts of the respective right and left images calculated by using the above expression (1) are compared with each other, and one of the images having the larger of the overall contrast values is set to a reference image. More specifically, the overall contrast values indicative of the overall contrasts of the right and left images are represented by CTR and CTL, respectively, and if CTR is greater than CTL, the right image is set to a reference image, while if CTL is greater than CTR, the left image is set to a reference image. In either case, the remaining image which is not set to the reference image is set to a comparison image.

Figure 5:
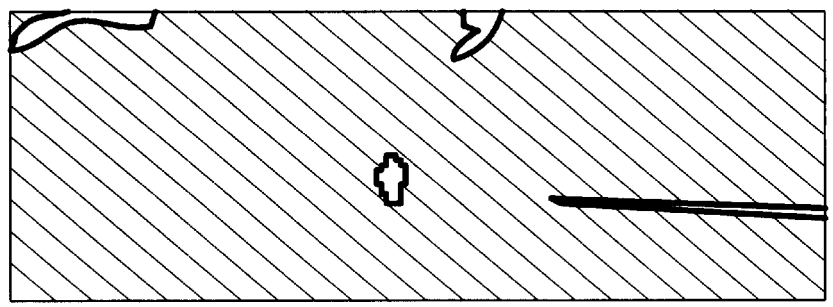
FIG. 5 is a diagram which is useful in explaining an image formed by binarization of a gray scale image, with a black area represented by a hatched one.

Referring again to FIG. 3, at step S15, the image signal (digital image data representative) of the reference image is binarized (converted to 1-bit data) such that an area at a luminance level equal to or higher than a luminance threshold ITH experimentally determined is set to "1" (white) and an area at a lower luminance level than the threshold ITH is set to "0" (black). Then, an image of an object targeted, e.g. for detecting the distance from the vehicle, is extracted from the binarized image data. FIG. 5 shows an image obtained by binarization of the FIG. 4A image. In the figure, a hatched area represents a black area, while areas surrounded by thick solid lines (high luminance areas) represent respective white areas. In the illustrated example, there are four white areas each extracted as an object image. In the following, description will be made by taking a case where the right image is set to the reference image.

Figure 7A:
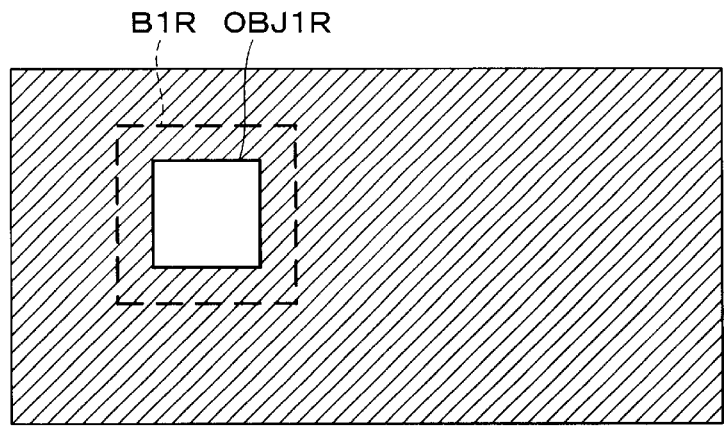
FIGS. 7A and 7B are diagrams useful in explaining a case in which a successful match occurs between object images contained in respective two images and a case in which an unsuccessful match occurs between the same.
Figure 7B:
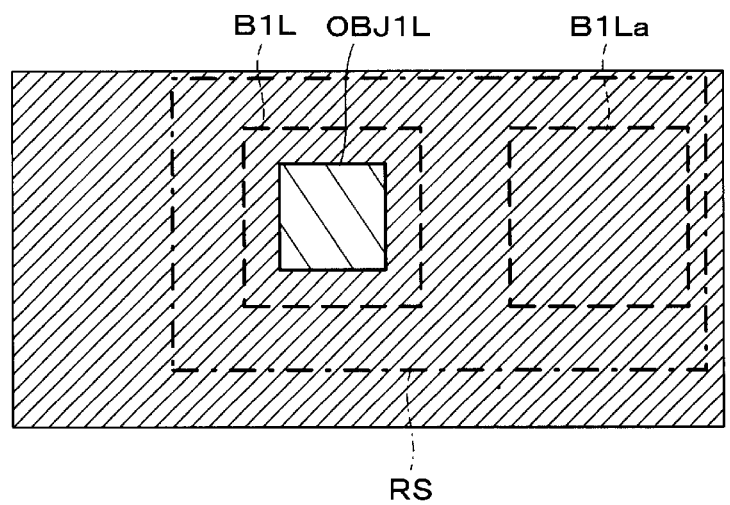

At the following step S16, a rectangular block B1R enclosing an extracted object image OBJ1R is set as shown in FIG. 7A, and a gray scale image of the area enclosed in the block B1R is set to a reference pattern. Then, a contrast value CR (indicative of a contrast) of the reference pattern is calculated by using an expression (2) shown below. It should be noted that FIGS. 7A and 7B show a case where there exists only one object OBJ1 having a shape simplified for clarity of representation and explanation. In these figures, an object image of the object OBJ1 in the right image is designated by OBJ1R, and an object image of the same in the left image by OBJ1L. The object image OBJ1L in the left image is hatched to indicate that the luminance of the object image OBJ1L is lower than that of the object image OBJ1R in the right image. Further, the background in each of the right and left images is more densely hatched to indicate that the luminance of the background is lower than that of the object image OBJ1R (OBJ1L).

$$CR = \beta \times \mathrm{Log}\,(IR - IB) \qquad (2)$$

wherein IR represents an average luminance value (indicative of an average luminance) of the object image OBJ1R, and IB represents an average luminance value (indicative of an average luminance) of the background portion within the reference pattern (i.e. a portion other than the object image OBJ1R within the block B1R). Each average luminance value is calculated by adding up luminance values of respective pixels forming the object image OBJ1R or the background portion to obtain a total of the luminance values, and then dividing the total by the number of the pixels (i.e. an area represented by the number of the pixels).

Actually, the contrast value CR is calculated by using the following expression (2a):

$$CR = \frac{\beta}{2}\mathrm{Log}\,\frac{VR \times (SR+SBR)^2}{SR \times SBR} \qquad (2a)$$

wherein SR and SBR represent an area of the object image OBJ1R and an area of the background portion (a length in an image is expressed by the number of pixels, and hence an area can also be expressed by the number of pixels; therefore, SR+SBR in the expression (2a) corresponds to the total number of the pixels within the block B1R.), and VR represents a variance of a luminance value I calculated by using the following expression (3):

$$VR = \frac{1}{SR+SBR}\sum (I(i) - IAV)^2 \qquad (3)$$

wherein I(i) represents a luminance value of each pixel within the block B1R; IAV represents an average value of the luminance values of all the pixels within the block B1R; and Σ represents a total operation carried out on all the pixels within the block B1R.

The expression (2a) is derived as follows. First, the expression (3) is expanded into the following expression (3a):

$$VR = \frac{1}{SR+SBR}\sum (I(i) - IAV)^2 = \qquad (3a)$$

$$\frac{1}{SR+SBR}\sum (I(i)^2 - 2 \times I(i) \times IAV + IAV^2) =$$

-continued $$\frac{1}{SR+SBR}\sum I(i)^2 - \underbrace{\frac{2}{SR+SBR}\sum I(i) \times IAV}_{= 2 \times IAV^2} +$$

$$\underbrace{\frac{1}{SR+SBR}\sum IAV^2}_{= IAV^2}$$

Since ΣI(i)/(SR+SBR)=IAV holds, the second term of the right side of the expression (3a) is equal to $2 \times IAV^2$. Further, since $\Sigma IAV^2 = (SR+SBR) \times IAV^2$ holds, the third term of the right side is equal to $IAV^2$. Accordingly, the expression (3a) can be transformed into an expression (3b) shown below, and then, by further transforming the expression (3b), an expression (4) shown below can be obtained.

Further, logarithms of the both sides of the expression (4) are multiplied by β/2 to thereby obtain an expression (5) shown below. By substituting the expression (2) (β Log (IR−IB)=CR) into the expression (5), and rearranging the resulting expression, the expression (2a) can be obtained.

$$VR = \frac{1}{SR+SBR}\sum I(i)^2 - 2 \times IAV^2 + IAV^2 = \qquad (3b)$$

$$\frac{1}{SR+SBR}\sum I(i)^2 - IAV^2 =$$

$$\frac{1}{SR+SBR}\sum I(i)^2 - \left(\frac{1}{SR+SBR}\sum I(i)\right)^2 =$$

$$\frac{1}{SR+SBR}(SR \times IR^2 + SBR \times IB^2) -$$

$$\left(\frac{1}{SR+SBR}(SR \times IR + SBR \times IB)\right)^2$$

$$VR = \frac{SR \times SBR}{(SR+SBR)^2}(IR - IB)^2 \qquad (4)$$

$$\frac{\beta}{2}\mathrm{Log}\,VR = \frac{\beta}{2}\mathrm{Log}\,\frac{SR \times SBR}{(SR+SBR)^2} + \beta\mathrm{Log}(IR - IB) \qquad (5)$$

Figure 8:
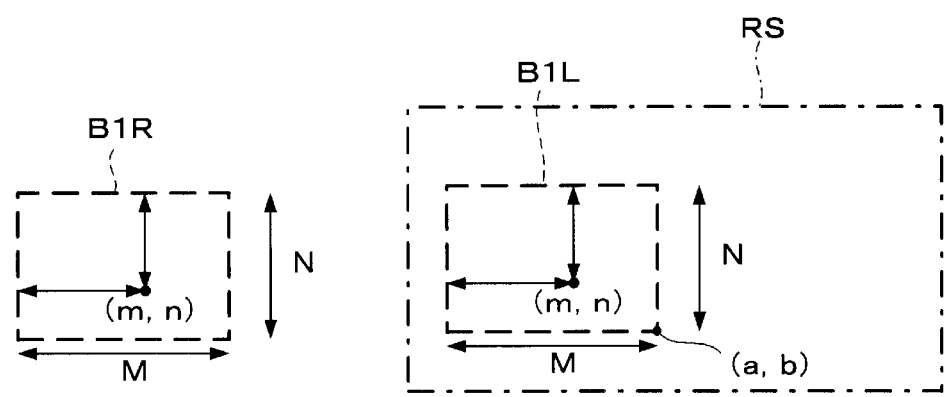
FIG. 8 is a diagram useful in explaining a process for searching for a corresponding pattern corresponding to a reference pattern.

Referring again to FIG. 3, at step S17, a corresponding pattern corresponding to the reference pattern is searched for by the SAD method. More specifically, a search area RS is set in the left image as shown in FIG. 7B, and then within the search area RS, correlation value ERR(a, b) indicative of a degree of correlation with the area of the rectangular block B1R is calculated by using an expression (6) shown below, to extract an area minimizing the correlation value ERR(a, b), as a corresponding block B1L. That is, a gray scale image of an area enclosed in the corresponding block B1L is extracted as a corresponding pattern.

$$ERR(a, b) = \sum_{n=0}^{N-1}\sum_{m=0}^{M-1} |ILS(a+m-M, b+n-N) - IRS(m, n)| \qquad (6)$$

wherein ISR(m, n) represents a luminance value of a position indicated by coordinates (m, n) in the block B1R appearing in FIG. 8, and ISL(a+m−M, b+n−N) represents a luminance value of a position indicated by coordinates (m, n) within a block B1L having the same shape as that of the block B1R with a reference point (origin of its own coordinate system) set to coordinates (a, b) in the search area RS. A position minimizing the correlation value ERR(a, b) is obtained by changing the coordinates (a, b) of the reference point, whereby the position of the corresponding block can be determined. The search area RS is set such that it is e.g. approximately twice larger in height or in the y direction than the block B1L and extends in a width direction or in the x direction from a position corresponding to a small distance to a position corresponding to an extreme far end of a distance-detectable area (i.e. a position corresponding to the maximum distance).

Then, steps S18 to S22 are executed to determine whether the correspondence between the corresponding pattern determined in the left image and the reference pattern is correct, i.e. whether a successful match occurs between the two patterns.

First, at step S18, similarly to the calculation of the contrast value CR of the reference pattern, a contrast value CL (indicative of a contrast) of the corresponding pattern in the left image is calculated by using the following expression (7):

$$CL = \frac{\beta}{2} \text{Log} \frac{VL \times (SL + SBL)^2}{SL \times SBL} \quad (7)$$

wherein VL represents a variance of the corresponding pattern which is calculated similarly to the variance VR of the reference pattern, and SL and SBL represent an area of the object image OBJ1L and an area of the background portion within the block B1L, respectively.

At step S19, a difference DC (=CR−CL) between the contrast value CR of the reference pattern calculated at step S16 and the contrast value CL of the corresponding pattern calculated at step S18 is calculated, and then, it is determined at step S20 whether or not the contrast difference DC is larger than a predetermined negative threshold value DCTH. If DC is less than or equal to DCTH, it is judged at step S24 that an unsuccessful match occurs between the two patterns.

The threshold value DCTH is set based on a condition of a successful match, which will be discussed in the following.

In the case shown in FIGS. 7A and 7B, a correlation value ERROK obtained when the proper block B1L is determined as a block corresponding to the block B1R in the right image is expressed by an expression (8) shown below, while a correlation value ERRNG obtained when an improper block B1La (formed by a background portion alone) is erroneously determined as a block corresponding to the block B1R is expressed by an expression (9) shown below. In these expressions (8) and (9), it is assumed that the luminance values IB of the backgrounds in the respective right and left images are identical to each other and smaller than the luminance values IR and IL of the respective object images (IB<IR and IB<IL).

$$ERROK = \quad (8)$$
$$\frac{1}{SR+SBR}(SR \times |IR-IL| + SBR \times (IB-IB)) = \frac{SR}{SR+SBR}|IR-IL|$$

$$ERRNG = \quad (9)$$
$$\frac{1}{SR+SBR}(SR \times (IR-IB) + SBR \times (IB-IB)) = \frac{SR}{SR+SBR}(IR-IB)$$

Therefore, for a successful match, a difference ΔERR (=ERRNG−ERROK) between the correlation value ERROK obtained when the proper block B1L is determined as the corresponding block and the correlation value ERRNG obtained when the improper block B1La is determined as the corresponding block is required to be larger than "0". That is, the condition of a successful match can be expressed by the following expression (10):

$$\Delta ERR = \frac{SR}{SR+SBR}(IR-IB-|IR-IL|) > 0 \quad (10)$$

Depending on which of the two luminance values IR and IL of the respective object images is the larger, the expression (10) can be rewritten in two different manners, as in Cases (1) and (2) defined below:

Case (1): If IR>IL holds, the condition of a successful match is expressed by the following expression (10a):

$$\Delta ERR = \frac{SR}{SR+SBR}(IL-IB) > 0 \quad (10a)$$

Assuming that IL>IB holds, the expression (10a) always holds.

Case (2): If IR<IL holds, the condition of a successful match is expressed by an expression (10b) shown below. By transforming the expression (10b), an expression (11) shown below is obtained, and by multiplying the logarithms of both sides of the expression (11) by β, an expression (12) shown below is obtained. The left side of the expression (12) is equal to the contrast difference DC. That is, the predetermined threshold value DCTH used at step S20 in FIG. 3 is required to be set to ·β×Log2 (DCTH=·β×Log2). As is apparent from the expression (11), the condition of a successful match is that the difference (=IR−IB) between the luminance value IR of the object image in the reference pattern and the luminance value IB of the background portion in the same is larger than ½ of the difference (=IL−IB) between the luminance value IL of the object image in the corresponding pattern and the luminance value IB of the background portion in the same.

$$\Delta ERR = \frac{SR}{SR+SBR}(2IR-IB-IL) > 0 \quad (10b)$$

$$\frac{IR-IB}{IL-IB} > \frac{1}{2} \quad (11)$$

$$\underbrace{\beta \text{Log}(IR-IB) - \beta \text{Log}(IL-IB)}_{DC} > \underbrace{-\beta \text{ Log2}}_{DCTH} \quad (12)$$

If DC>DCTH holds at step S20, a correlation value component corresponding to the contrast difference DC, i.e. a correlation value component ERRDC caused by the contrast difference DC between the reference pattern and the corresponding pattern, is calculated at step S21.

In general, the correlation value ERR can be expressed by an expression (13) shown below as the sum of a shape component ERRFIG caused by a difference in shape between object images and a contrast difference component ERRDC caused by a difference in luminance (difference in contrast) ascribable to a difference in characteristics between the two cameras.

$$ERR = ERRFIG + ERRDC \quad (13)$$

When a successful match occurs, ERRFIG becomes "0", and hence the correlation value ERR in this case becomes equal to the contrast difference component ERRDC.

More specifically, in Case (1) described above, the expression (8) can be transformed into an expression (14) shown below, and the contrast difference DC is expressed by an expression (15) shown below, so that an expression (16) is obtained from the expression (15), and then an expression

(17) is obtained by substituting the expression (16) into the expression (14).

$$ERROK = \frac{SR}{SR+SBR}(IR-IL) = \frac{SR}{SR+SBR}(IR-IB-(IL-IB)) \quad (14)$$

$$DC = CR - CL = \beta Log IR - \frac{IB}{IL-IB} \quad (15)$$

$$IL - IB = (IR - IB) \times 10^{-DC/\beta} \quad (16)$$

$$ERROK = \frac{SR}{SR+SBR}(IR-IB)(1-10^{-DC/\beta}) = ERRDC \quad (17)$$

On the other hand, in Case (2) described above, the expression (8) can be transformed into an expression (18) shown below, and hence an expression (19) is obtained by substituting the expression (16) into the expression (18).

$$ERROK = \frac{SR}{SR+SBR}(IL-IR) = \frac{SR}{SR+SBR}(IL-IB-(IR-IB)) \quad (18)$$

$$ERROK = \frac{SR}{SR+SBR}(IR-IB)(10^{-DC/\beta}-1) = ERRDC \quad (19)$$

At step S22, it is determined whether or not a value (shape component ERRFIG) obtained by subtracting the contrast difference component ERRDC from the correlation value ERR is smaller than a predetermined threshold value γ. If ERR−ERRDC<γ holds, it is judged at step S23 that a successful match occurs between the two patterns, whereas if ERR−ERRDC≧γ holds, it is judged at step S24 that an unsuccessful match occurs between the two patterns.

Figure 9A:
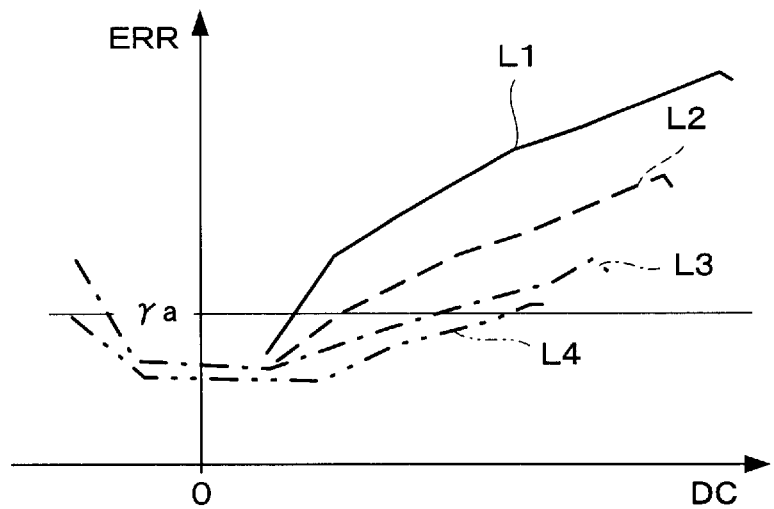
FIGS. 9A and 9B are diagrams showing the relationship between a difference in contrast (DC) and a correlation value (ERR)

FIG. 9A shows the relationship between the contrast difference DC and the correlation value ERR. As shown in the figure, with an increase in the absolute value of the contrast difference DC, the contrast difference component ERRDC of the correlation value ERR becomes larger, whereby the correlation value ERR is increased. A solid line L1, a broken line L2, a one-dot chain line L3, and a two-dot chain line L4 in the figure indicate results of experimental measurements carried out on objects having respective different shapes. In this case, if determination of whether a successful match occurs is carried out based on whether the correlation value ERR is smaller than a predetermined threshold value (e.g. γa in the figure), when the contrast difference DC is large, even an actually successful match is judged to be an unsuccessful one.

Figure 9B:
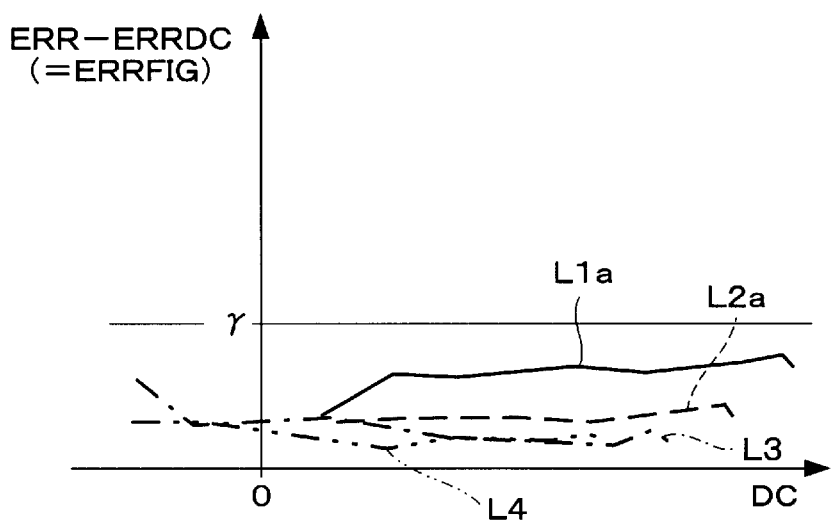

On the other hand, FIG. 9B shows the relationship between the shape component ERRFIG obtained by subtracting the contrast difference component ERRDC from the correlation value ERR shown in FIG. 9A and the contrast difference DC (lines L1a, L2a, L3a, and L4a in the figure correspond to lines L1 to L4 in FIG. 9A, respectively). As shown in FIG. 9B, the shape component ERRFIG is substantially constant regardless of the contrast difference DC. Therefore, by setting the predetermined threshold value γ as shown in FIG. 9B, it is possible to properly determine a match of object images of any object.

After completion of the image-recognizing processing described above, if a successful match occurs, the image-processing unit 2 calculates a parallax between the object image contained in the reference pattern in the right image and the object image contained in the corresponding pattern in the left image and executes processing for calculating a distance from the vehicle 10 to the object based on the parallax, and so forth. Then, the image-processing unit 2 makes determination as to possibility of collision between the object and the vehicle 10, based on the calculated distance from the vehicle 10 to the object and the other position information of the object (i.e. position coordinates of the object in horizontal and vertical directions orthogonal to a direction of running of the vehicle 10) and warns the driver if the possibility is high, via the speaker 3 and the HUD 4.

As described above, in the present embodiment, the contrast difference component ERRDC which is a correlation value component corresponding to the difference between the contrast value CR of the reference pattern and the contrast value CL of the corresponding pattern extracted by the SAD method is calculated, and then the contrast difference component ERRDC is subtracted from the correlation value ERR (minimum value) calculated for extraction of the corresponding pattern, so as to determine whether or not a successful match occurs, i.e. whether or not the object images contained in the respective reference and corresponding patterns are identical to each other. Therefore, even when the two cameras 1R, 1L are different in characteristics (i.e. when images output from the respective cameras 1R, 1L are different in contrast), it is possible to accurately determine identity between the object images in the respective right and left images obtained by the two cameras, with hardware having a relatively simple construction and through a small amount of arithmetic operation.

Further, the overall contrast values CTR, CTL of the respective right and left images are calculated, and then one of the images which has the larger of the two calculated contrast values is set to a reference pattern. This enables reliable determination of a match between the two patterns. This is because an unsuccessful match (mismatch) due to a contrast difference between the two images does not occur when the contrast value CR of the reference pattern is larger than the contrast value CL of the corresponding pattern, as described hereinabove in the discussion of the condition of a successful match.

Figure 10A:
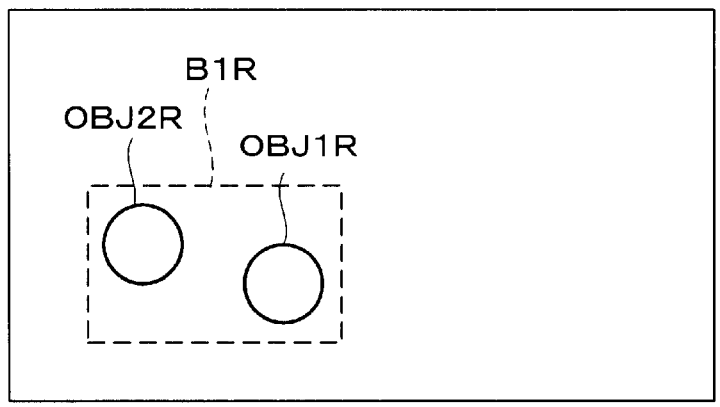
Figure 10B:
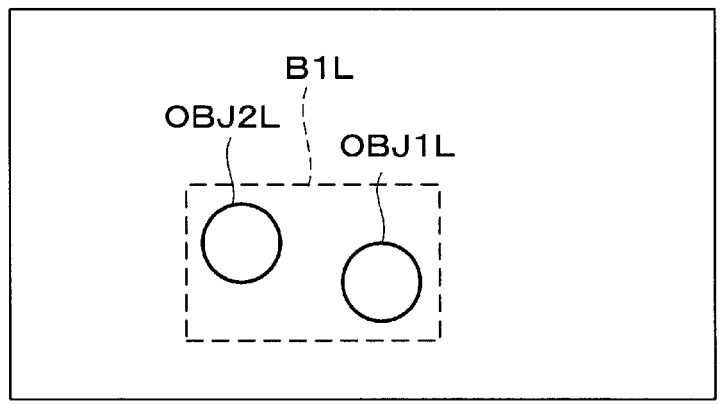

When a plurality of object images similar in shape exist in each of right and left images as shown in FIGS. 10A, 10B, assuming that the average luminance values of the object images OBJ1R, OBJ2R in the right image are represented by I1R, I2R, respectively, and the average luminance values of the object images OBJ1L, OBJ2L in the left image by I1L, I2L, respectively, and that one of the images whose overall contrast value is the larger is set to a reference pattern, the relationships of I1R>I1L and I2R>I2L hold. In this case, an unsuccessful match occurs only when a condition represented by an expression (20) shown below is satisfied:

$$|I2R-I1L|<I2R-I2L \quad (20)$$

More specifically, when the expression (20) holds, a correlation value (based on an improper correspondence) ERRM between a reference pattern containing the object image OBJ2R and a corresponding pattern containing the object image OBJ1L is smaller than a correlation value (based on a proper correspondence) ERRS between the reference pattern containing the object image OBJ2R and a corresponding pattern containing the object image OBJ2L, and as a result, an unsuccessful match (mismatch) occurs.

In such a case, it is desirable that a clustering block B1R is set by clustering such that the object images OBJ1R and OBJ2R are enclosed therein as shown in FIG. 10A, and that a gray scale image of the area enclosed in the block B1R is set to a reference pattern, whereby a corresponding pattern is searched for in the left image. This makes it possible to determine occurrence of a successful match when two objects corresponding to the object images OBJ1R and OBJ2R exist at respective locations close to each other in a real space, which prevents erroneous recognition of the correspondences between the object images in the two images.

In the present embodiment, the infrared cameras 1R, 1L correspond to imaging means, and the image-processing unit 2 constitutes the image recognition system. More specifically, steps S14, S15, and S17 in FIG. 3 correspond to corresponding pattern-extracting means, steps S16, S18, S19, and S21 in the same to contrast difference component-calculating means, and steps S22 to S24 in the same to identity-determining means. Further, the correlation value ERR corresponds to a correlation parameter.

It should be noted that the invention is not limited to the above embodiment, but various variations and modifications are possible. For instance, in the above embodiment, it is assumed that the luminance value of each object image is higher than that of the corresponding background portion. When the luminance value of the background portion is higher than that of the object image (IB>IR and IB>IL), the same method can be applied to determine whether or not a successful match occurs. In this case, however, the condition of a successful match is expressed as follows.

Case (1): When IR>IL holds, the above expression (10) is replaced by an expression (10c) shown below. The expression (10c) is transformed into an expression (11a) shown below, and then an expression (12a) shown below is obtained by multiplying the logarithms of both sides of the expression (11a) by β. The expression (12a) defines the condition of a successful match.

$$\Delta ERR = \frac{SR}{SR+SBR}(IL+IB-2IR) > 0 \qquad (10c)$$

$$\frac{IB-IR}{IB-IL} > \frac{1}{2} \qquad (11a)$$

$$\underbrace{\beta Log(IB-IR) - \beta Log(IB-IL)}_{DC} > \underbrace{-\beta Log2}_{DCTH} \qquad (12a)$$

Case (2): When IR<IL holds, the condition of a successful match is expressed by the following expression (10d):

$$\Delta ERR = \frac{SR}{SR+SBR}(IB-IL) > 0 \qquad (10d)$$

Since IL<IB is a prerequisite, the expression (10d) always holds.

Moreover, although in the above embodiment, the infrared cameras are used as imaging means, this is not limitative, but TV cameras capable of detecting only normal visible rays may be employed. Further, the positions of the two imaging means are not limited to the positions shown in FIG. 2, but they may be arranged otherwise so long as they are positioned apart from each other.

It is further understood by those skilled in the art that the foregoing is a preferred embodiment of the invention, and that various changes and modifications may be made without departing from the spirit and scope thereof.

What is claimed is:

1. An image recognition system for recognizing correspondence between object images contained respectively in two images obtained by two imaging means, the image recognition system comprising:

corresponding pattern-extracting means for setting one of the two images obtained by the two imaging means to a reference image and the other of the two images to a comparison image, calculating a correlation parameter indicative of a correlation between a reference pattern contained in the reference image and containing an object image, and each pattern contained in the comparison image and identical in shape to the reference pattern, by using a luminance value indicative of a luminance of the reference pattern and a luminance value indicative of a luminance of each pattern contained in the comparison image, and extracting, based on the calculated correlation parameter, a pattern having a highest correlation with the reference pattern from the comparison image, as a corresponding pattern which corresponds to the reference pattern; and identity-determining means for determining identity between the object image contained in the reference pattern and an object image contained in the corresponding pattern based on a difference between a contrast value indicative of a contrast of the reference pattern and a contrast value indicative of a contrast of the corresponding pattern.

2. An image recognition system according to claim 1, wherein said identity-determining means includes contrast difference component-calculating means for calculating a correlation parameter component corresponding to the difference between the contrast value indicative of the contrast of the reference pattern and the contrast value indicative of the contrast of the corresponding pattern, as a contrast difference component, and determination means for determining identity between the object image contained in the reference pattern and the object image contained in the corresponding pattern, based on a parameter obtained by subtracting the contrast difference component from the correlation parameter concerning the corresponding pattern.

3. An image recognition system according to claim 1, wherein said identity-determining means calculates the contrast value indicative of the contrast of the reference pattern based on a difference between a luminance value indicative of a luminance of the object image contained in the reference pattern and a luminance value indicative of a luminance of a background portion within the reference pattern, and calculates the contrast value indicative of the contrast of the corresponding pattern based on a difference between a luminance value indicative of a luminance of the object image contained in the corresponding pattern and a luminance value indicative of a luminance of a background portion within the corresponding pattern.

4. An image recognition system according to claim 1, wherein said corresponding pattern-extracting means calculates overall contrast values indicative of overall contrasts of the two images, respectively, and sets one of the two images whose overall contrast value is the larger one of the calculated overall contrast values, to the reference image.

5. An image recognition system according to claim 4, wherein said corresponding pattern-extracting means calculates each of the overall contrast values indicative of the overall contrasts of the two images by the following steps:

(1) generating a histogram indicative of a frequency distribution of luminance values of each of the two images;

(2) calculating a background peak luminance value at which a portion of the histogram corresponding to a background of the each of the two images exhibits a maximum frequency;

(3) calculating an object peak luminance value at which a portion of the histogram corresponding to the object image contained in the each of the two images exhibits a maximum frequency; and (4) calculating the overall contrast value for the each of the two images based on a difference between the object peak luminance value and the background peak luminance value of the corresponding image.

6. An image recognition system according to claim 1, wherein said identity-determining means determines that the object image contained in the reference pattern and the object image contained in the corresponding pattern are not identical when the difference between the contrast value indicative of the contrast of the reference pattern and the contrast value indicative of the contrast of the corresponding pattern is larger than a predetermined value.

7. An image recognition system according to claim 1, wherein said corresponding pattern-extracting means includes means for setting the reference pattern by clustering such that the reference pattern contains a plurality of similar objects positioned close to each other.

8. A method for recognizing correspondence between object images contained respectively in two images obtained by two imaging means, the method comprising the steps of:

setting one of the two images obtained by the two imaging means to a reference image and the other of the two images to a comparison image;

calculating a correlation parameter indicative of a correlation between a reference pattern contained in the reference image and containing an object image, and each pattern contained in the comparison image and identical in shape to the reference pattern, by using a luminance value indicative of a luminance of the reference pattern and a luminance value indicative of a luminance of each pattern contained in the comparison image;

extracting, based on the calculated correlation parameter, a pattern having a highest correlation with the reference pattern from the comparison image, as a corresponding pattern which corresponds to the reference pattern; and determining identity between the object image contained in the reference pattern and an object image contained in the corresponding pattern based on a difference between a contrast value indicative of a contrast of the reference pattern and a contrast value indicative of a contrast of the corresponding pattern.

\* \* \* \* \*

UNITED STATES PATENT AND TRADEMARK OFFICE
CERTIFICATE OF CORRECTION

PATENT NO. : 6,658,150 B2
DATED : December 2, 2003
INVENTOR(S) : Takayuki Tsuji et al.

It is certified that error appears in the above-identified patent and that said Letters Patent is hereby corrected as shown below:

Title page,
Item [74], *Attorney, Agent, or Firm*, change "Associates, P.C.; Joseph F. Carrier; William D. Blackman" to -- Associates, P.C.; Joseph P. Carrier; William D. Blackman --.

Column 8,
Line 7, change "$\dfrac{\frac{1}{SR + SBR}\Sigma IAV^2}{2 \times IAV^2}$" to -- $\dfrac{\frac{1}{SR + SBR}\Sigma IAV^2}{IAV^2}$ --.

Column 10,
Line 26, change "$\cdot \beta \times Log2(DCTH = \cdot \beta \times Log2).$" to -- $-\beta \times Log2 \ (DCTH = -\beta \times Log2).$ --.

Column 11,
Line 6, change "$DC = CR - CL = \beta LogIR - \dfrac{IB}{IL\text{-}IB} \quad (15)$" to -- $DC = CR - CL = \beta Log \dfrac{IR\text{-}IB}{IL\text{-}IB} \quad (15)$ --.

Signed and Sealed this

Seventh Day of September, 2004

JON W. DUDAS
*Director of the United States Patent and Trademark Office*